US008555292B2

(12) United States Patent
Haba

(10) Patent No.: US 8,555,292 B2
(45) Date of Patent: Oct. 8, 2013

(54) SYNCHRONIZING COMMUNICATION OVER SHARED MEMORY

(75) Inventor: Erez Haba, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1248 days.

(21) Appl. No.: 12/147,531

(22) Filed: Jun. 27, 2008

(65) Prior Publication Data
US 2009/0328059 A1 Dec. 31, 2009

(51) Int. Cl.
G06F 9/44 (2006.01)

(52) U.S. Cl.
USPC ........... 719/312; 719/313; 719/314; 719/315; 719/316; 717/106; 717/127; 717/131; 717/162; 717/167; 718/1; 718/100; 718/105; 718/107; 718/108; 710/200; 710/220; 713/300; 711/100; 711/147; 709/213; 709/248

(58) Field of Classification Search
None
See application file for complete search history.

(56) References Cited

U.S. PATENT DOCUMENTS

| 4,914,653 | A | * | 4/1990 | Bishop et al. | 370/462 |
|---|---|---|---|---|---|
| 5,313,638 | A | | 5/1994 | Ogle et al. | |
| 5,379,432 | A | * | 1/1995 | Orton et al. | 719/315 |
| 5,390,328 | A | * | 2/1995 | Frey et al. | 719/315 |
| 5,513,328 | A | * | 4/1996 | Christofferson | 709/244 |
| 5,548,728 | A | | 8/1996 | Danknick | |
| 5,555,396 | A | | 9/1996 | Alferness et al. | |
| 5,706,515 | A | * | 1/1998 | Connelly et al. | 718/106 |
| 5,727,203 | A | * | 3/1998 | Hapner et al. | 1/1 |
| 5,991,820 | A | | 11/1999 | Dean | |
| 6,029,205 | A | | 2/2000 | Alferness et al. | |
| 6,038,604 | A | * | 3/2000 | Bender et al. | 709/233 |
| 6,067,541 | A | * | 5/2000 | Raju et al. | 1/1 |
| 6,105,050 | A | * | 8/2000 | Govindaraju et al. | 718/102 |
| 6,128,640 | A | * | 10/2000 | Kleinman | 718/102 |
| 6,173,442 | B1 | * | 1/2001 | Agesen et al. | 717/141 |
| 6,178,529 | B1 | * | 1/2001 | Short et al. | 714/51 |
| 6,381,656 | B1 | * | 4/2002 | Shankman | 710/18 |
| 6,385,659 | B1 | * | 5/2002 | Tuel, Jr. | 719/313 |
| 6,505,244 | B1 | * | 1/2003 | Natarajan et al. | 709/223 |
| 6,754,664 | B1 | * | 6/2004 | Bush | 1/1 |
| 6,799,317 | B1 | | 9/2004 | Heywood et al. | |
| 6,859,829 | B1 | * | 2/2005 | Parupudi et al. | 709/224 |

(Continued)

OTHER PUBLICATIONS

Buntinas, et al., "Implementation and Evaluation of Shared-Memory Communication and Synchronization Operations in MPICH2 using the Nemesis Communication Subsystem", Parallel Computing, vol. 33, Issue 9, Jun. 8, 2007, pp. 1-17.

(Continued)

Primary Examiner — Andy Ho
Assistant Examiner — Shih-Wei Kraft
(74) Attorney, Agent, or Firm — Michael B Dodd; Dodd Law Group

(57) ABSTRACT

Two threads may communicate via shared memory using two different modes. In a polling mode, a receiving thread may poll an indicator set by the sending thread to determine if a message is present. In a blocking mode, the receiving thread may wait until a synchronization object is set by the sending thread which may cause the receiving thread to return to the polling mode. The polling mode may have low latency buy may use processor activity of the receiving thread to repetitively check the indictor. The blocking mode may have a higher latency but may allow the receiving thread to enter a sleep mode or perform other activities.

16 Claims, 2 Drawing Sheets

(56) References Cited

U.S. PATENT DOCUMENTS

| | | | |
|---|---|---|---|
| 6,901,596 B1* | 5/2005 | Galloway | 719/330 |
| 7,096,259 B1 | 8/2006 | Gray et al. | |
| 7,140,025 B1* | 11/2006 | Dillow et al. | 719/313 |
| 7,356,670 B2 | 4/2008 | Van et al. | |
| 7,594,234 B1* | 9/2009 | Dice | 718/108 |
| 7,743,191 B1* | 6/2010 | Liao | 710/240 |
| 2003/0023775 A1* | 1/2003 | Blackmore et al. | 709/330 |
| 2003/0140179 A1* | 7/2003 | Wilt et al. | 709/321 |
| 2003/0204552 A1* | 10/2003 | Zuberi | 709/103 |
| 2004/0015979 A1* | 1/2004 | Shen et al. | 718/107 |
| 2004/0025069 A1* | 2/2004 | Gary et al. | 713/300 |
| 2004/0093389 A1* | 5/2004 | Mohamed et al. | 709/212 |
| 2004/0128563 A1* | 7/2004 | Kaushik et al. | 713/300 |
| 2004/0181700 A1* | 9/2004 | Katoh et al. | 713/300 |
| 2005/0108398 A1* | 5/2005 | Levanoni et al. | 709/225 |
| 2005/0182977 A1* | 8/2005 | Powers et al. | 713/300 |
| 2005/0251639 A1* | 11/2005 | Vishin et al. | 711/168 |
| 2006/0005197 A1* | 1/2006 | Saha et al. | 718/104 |
| 2006/0047856 A1* | 3/2006 | Tripathi | 709/250 |
| 2006/0085791 A1* | 4/2006 | Day et al. | 718/100 |
| 2006/0095606 A1* | 5/2006 | Emmes et al. | 710/46 |
| 2006/0117325 A1* | 6/2006 | Wieland et al. | 719/321 |
| 2006/0136756 A1* | 6/2006 | Rothman et al. | 713/300 |
| 2006/0179255 A1 | 8/2006 | Yamazaki | |
| 2007/0025351 A1* | 2/2007 | Cohen | 370/390 |
| 2007/0288931 A1* | 12/2007 | Avkarogullari | 719/312 |
| 2008/0184234 A1* | 7/2008 | Vutharkar et al. | 718/100 |

OTHER PUBLICATIONS

Lumetta, et al., "Managing Concurrent Access for Shared Memory Active Messages", In Proceedings of the International Parallel Processing Symposium, Apr. 1998, pp. 7.

Jin, et al., "Performance Evaluation of Remote Memory Access (RMA) Programming on Shared Memory Parallel Computers", NAS Technical Report, Jan. 2003, pp. 1-20.

"Process Synchronization and Communication using Shared Memory", retrieved at << http://bcook.cs.georgiasouthern.edu/cs523/critical.htm >>, pp. 6, Dated Apr. 17, 2008.

* cited by examiner

SYNCHRONIZING COMMUNICATION OVER SHARED MEMORY

BACKGROUND

Many multi threaded systems may communicate via shared memory. Shared memory may be a random access memory for which threads may have access. In some uses, the shared memory may be an extremely fast and useful manner to pass communication signals and messages between the threads. Such speed may be advantageous in various applications, including massively parallel processing applications such as supercomputers.

SUMMARY

Two threads may communicate via shared memory using two different modes. In a polling mode, a receiving thread may poll an indicator set by the sending thread to determine if a message is present. In a blocking mode, the receiving thread may wait until a synchronization object is set by the sending thread which may cause the receiving thread to return to the polling mode. The polling mode may have low latency buy may use processor activity of the receiving thread to repetitively check the indictor. The blocking mode may have a higher latency but may allow the receiving thread to enter a sleep mode or perform other activities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
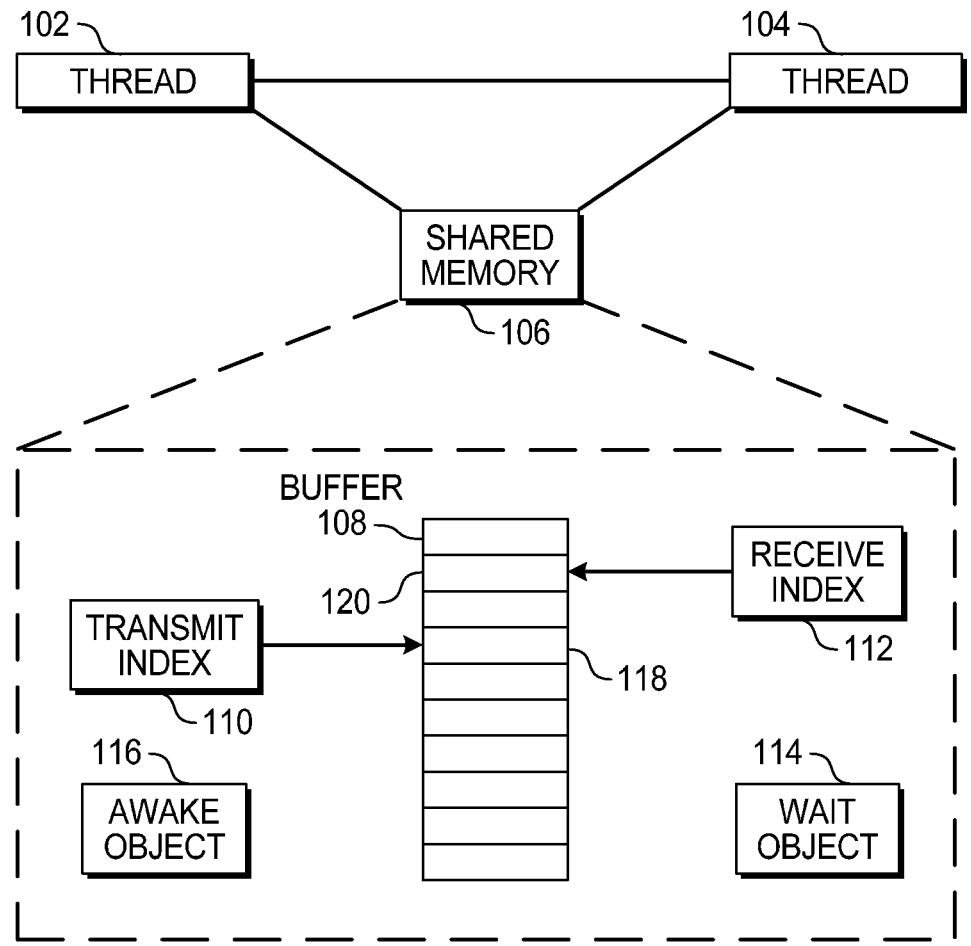
FIG. 1 is a diagram illustration of an embodiment showing a system for communicating through shared memory.

Two threads may communicate over shared memory using two forms of communication. In a polling form of communication, the receiving thread may repeatedly poll a memory location to determine if a message is available. When a message becomes available, the receiving thread may immediately retrieve the message and process the message. In a notification form of communication, the sending thread may initiate an operation that may 'wake' the receiving thread, which may then retrieve the message.

In a polling form of communication, the message transfer latency is very low, but the receiving thread may use processor cycles to periodically inspect or poll an indicator. In the notification form of communication, the receiving thread may not expend processing cycles to poll the indicator, but the latency for message transfer may be greater.

The polling form of communication may be used for general communication, but the receiving thread may have the ability to stop the polling mode and revert to the notification mode. In some cases, the receiving thread may enter the notification mode when there are no activities to perform and when the polling operation has been performed for a designed time. In such a case, the receiving thread may enter a low power mode. In some cases, the receiving thread may begin performing a task that may use a large amount of computational or processor power and may elect to stop the polling form of communication.

The dual processor communication process may be used in any embodiment where two threads may communicate using shared memory. In some embodiments, the two threads may operate on a single processor or integrated circuit or chip and share an L2 memory cache. In other embodiments, the two threads may be located on different integrated circuits and share a common random access memory device. In still other embodiments, different controllers may reside on separate printed circuit boards within a computing device, where each controller may execute separate execution threads and share a common memory location. In yet other embodiments, two threads may reside in different devices yet may share access to a common memory location. In still other embodiments, two threads that share the same process address space may communicate using the shared address space.

The term 'threads' as used in this description may be any execution sequence executed by a component, group of components, devices, or portions of a component that may perform the functions described. In some embodiments, a thread may be executed by a general purpose computing microprocessor, such as a central processing unit (CPU) that may be embodied in a single integrated circuit.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for communicating through a shared memory. Embodiment 100 is a simplified example of some components that may be used to communicate through shared memory using a polling mechanism as well as a notification mechanism.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 shows two threads 102 and 104 that may have access to the shared memory 106. In a typical embodiment, the threads 102 and 104 and the shared memory 106 may be executed in a single integrated circuit. In such an embodiment, the shared memory 106 may be an L2 cache, for example. One such use may be a personal computer that has a single or dual processor central processor unit. Such processors may also be used in large, parallel, high performance computing platforms such as supercomputers that may have hundreds of such dual processor units.

In another embodiment, each thread 102 and 104 may be executed within a controller in a dual-controller apparatus. One such example may be a dual controller configuration for a disk storage system such as a storage area network, or a dual controller architecture that may be used for redundancy purposes such as controller systems used in aviation or military applications.

The two threads 102 and 104 may be executed on identical processors in some embodiments. In other embodiments, the two threads 102 and 104 may be executed on different types of processors or different devices. In some cases, the thread 102 may be operated on a master processor, for example, and the thread 104 may be operated on a secondary or slave processor. In some embodiments, one of the threads may be operated on a processor that may have different capabilities, processing speed, clock speed, or be configured differently than another processor on which the second thread executes.

The shared memory 106 may be any type of memory device or system that both threads 102 and 104 may access. In some cases, one thread may be able to access the shared memory 106 at a different speed or with different bandwidth than another thread. In other cases, both thread may be able to access the shared memory 106 similarly.

The threads 102 and 104 may be able to communicate using two different methods of communicating. In a polling method, a receiving thread may poll a memory location to determine if a message is pending. When the memory location indicates that a message is available, the receiving thread may access the message through the shared memory 106.

In the polling method, the sending thread may load the message into the shared memory 106 and change the status or value of the polled memory location. After that action occurs, the sending thread may perform other functions without having to expend any other processor cycles to transmit the message. In the polling method, the receiving thread may expend processor cycles to periodically check or poll the status of the polled memory location.

In a notification method, the receiving thread may wait until the sending thread may perform a function that causes the receiving thread to retrieve the waiting message. In the notification method, the sending thread may perform at least one additional task to notify the receiving processor.

In many embodiments, the communication method may periodically change from a polling method to a notification method and back again, depending on the workload of each thread. When the receiving thread is not very busy compared to the sending thread, a polling method may be used. When the receiving thread is more busy than the sending thread, the notification method may be used.

In many multiple thread systems, either thread may act as a sending or receiving thread. In some embodiments, both thread may be configured to send and receive messages. For the purposes of this specification, the processes, steps, and methods attributed to a sending or receiving thread may apply to the thread acting in such a role. In some cases, a thread may simultaneously be configured to act in both roles.

The communication between the two threads may use a buffer 108 in which addresses to a location in the shared memory 106 are stored. The buffer 108 may be a circular or first in, first out buffer. In some embodiments, a receiving thread may retrieve an address from the buffer 108 and may use the address to retrieve a message from the shared memory 106. Other embodiments may have different configurations or may use different functional elements.

After loading a message in the shared memory 106, a sending thread may load an address in a register in the buffer 108 and may increment the transmit index 110 to point to that register in the buffer 108. In the embodiment 100, the transmit index may be pointing to the register 118.

The sending thread may examine a wait object 114 which may serve as an indicator that the receiving processor is in a polling mode. If the receiving thread is in a polling mode, the sending thread may be return to other operations.

The receive index 112 may point to the register in the buffer 108 that was last processed by the receiving thread. In the example of embodiment 100, the receive index 112 is illustrated as pointing to the register 120.

When the receive index 112 points to a different register than the transmit index 110, the receiving thread may process the next message as defined in the buffer 108. In some cases, two, three, or many messages may be queued in the buffer 108 for the receiving thread. The receiving thread may process each message until the receive index 112 is pointing to the same register as the transmit index 110.

In the example of embodiment 100, the receive index 112 and transmit index 110 may be used to reference specific registers within the buffer 108. In some embodiments, the receive index 112 and transmit index 110 may be incremental counters or some other object that is not related to a specific register in the buffer 108. Other architectures, memory objects, and functions may also be used.

When a receiving thread is not in a polling mode, the receiving thread may enable a wait object 114. The wait object 114 may be any indicator that may be used by a sending thread to detect that the receiving thread is not polling for messages. The wait object 114 may be as simple as a flag or bit that is toggled to indicate the communication method. In some embodiments, the wait object 114 may be a process, function, method, or some other object that may be used to indicate the communication method.

When a sender thread detects that the receiving thread is not in a polling communication mode, the sender thread may actuate an awake object 116. The awake object 116 may cause the receiving thread to begin polling when able. In some cases, the awake object 116 may cause the receiving thread to awaken from a low power mode. In other cases, the awake object 116 may be used to notify the receiving thread to begin polling communication when the receiving thread has completed any current activity. In some cases, the awake object 116 may interrupt an existing process being performed on the receiving processor.

The awake object 116 may be any mechanism by which the sending thread may cause the receiving thread to return to a polling mode. In some embodiments, the awake object 116 may be a semaphore, event, message, interrupt, or some other mechanism.

The operations of the sending thread and receiving thread may be completely independent of each other. The sending thread may add items to the buffer 108 asynchronously from the receiving thread that may pull items from the buffer 108 as the receiver thread has the processing bandwidth or availability.

Figure 2:
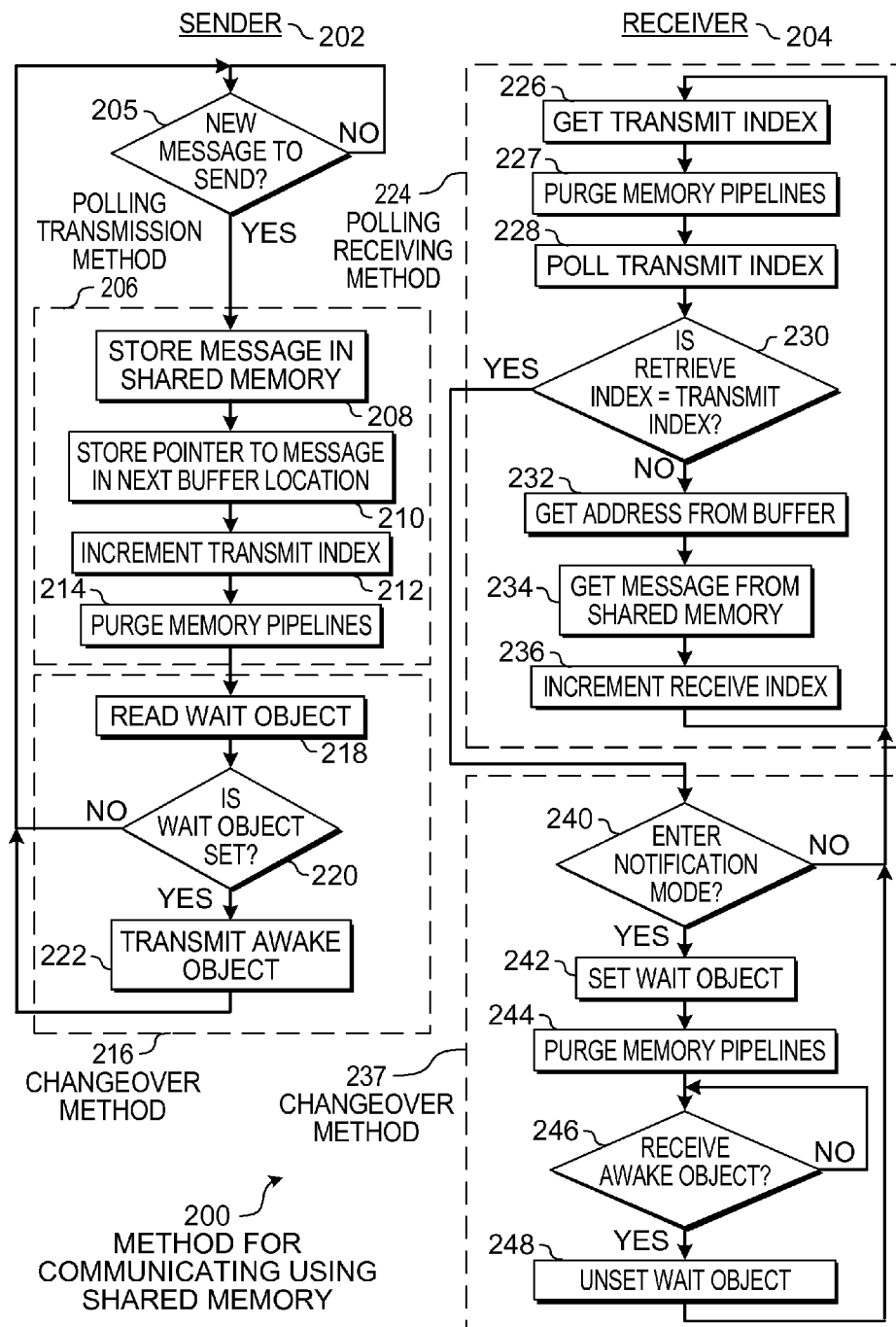
FIG. 2 is a flowchart illustration of an embodiment showing a method for communicating through shared memory.

FIG. 2 is a flowchart illustration of an embodiment 200 showing a method for performing the operations of a sending thread and a receiving thread. Embodiment 200 illustrates methods that may be performed asynchronously by a sending thread 202 and a receiving thread 204.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a method that may be used by a sending thread 202 and a receiving thread 204 to communicate using two different modes of communication: a polling mode and a notification mode.

The functions performed by the sending thread 202 and the receiving thread 204 may be asynchronous. The two thread may communicate by writing and reading various memory objects in a shared memory space. In a typical communication, one thread may change a memory object that may be read by the other thread at some later time.

The operations of a sending thread 202 are illustrated on the left hand side of FIG. 2 and the operations of a receiving thread 204 are illustrated on the right hand side.

When the sending thread 202 has a new message to send to the receiving thread in block 205, the sending thread 202 may transmit the message using a polling transmission method 206. If the receiving thread 204 is not operating in a polling transmission method, a changeover method 216 may be used to notify the receiver thread 204 that the message is available.

The polling transmission method 206 for the sending thread 202 may include storing the message in shared memory in block 208. The message stored in block 208 may be the payload of the communication between the sending thread 202 and the receiving thread 204.

After storing the message in block 208, the sending thread 202 may store a pointer to the message in the next available buffer location in block 210. The buffer of block 210 may be a circular buffer or first in, first out buffer that contains pointers to the messages to send.

The transmit index may be incremented in block 212. In many embodiments, the transmit index of block 212 may point to the register in the buffer of block 210 that contains the latest message.

After incrementing the transmit index in block 212, the memory pipelines may be purged in block 214. Memory pipelines are commands and memory locations that may be queued for a processor to execute. By forcing a purge in block 214, the memory locations may be forced to be updated before any other operation occurs.

In many cases, compilers and processors may adjust the sequence and timing of various operations to optimize the speed or other performance factors. Some compilers may vary the order of operations slightly, for example. Some advanced processors may delay writing a value to memory in another example.

By purging the memory pipelines in block 214, the writing operations of the transmit index of block 212 may be forced to occur immediately. This operation may prevent or minimize a race condition that may occur when the update of the transmit index of block 212 is delayed and the receiving thread may enter a notification mode while a message is available for reading.

When the receiving thread is in a notification mode, the receiving thread may set a wait object. The wait object may be read by the sending thread in block 218, and if the wait object is set in block 220, the sending thread may transmit an awake object in block 222. If the wait object is not set in block 220, the process may return to block 205.

The awake object transmitted in block 222 may be any type of function or notification mechanism that may cause the receiving thread to change from a notification mode to a polling mode to retrieve the waiting message. In some cases, the awake object in block 222 may be a communication through a different communication path than the shared memory. In some embodiments, the sending thread and receiving thread may have some communication paths, one of which may be used to awaken or notify a receiving thread. Such a communication path may include an input line or signal that may be actuated by the sending thread, for example.

The memory pipeline purge in block 214 may serve to ensure that the wait object read in block 218 is up to date. In many memory pipeline configurations, a pre-processor may gather commands and relevant memory objects into a pipeline for processing. When an object is in the pipeline, any updates to the object may be ignored. By purging the pipeline in block 214 just before the read wait object operation in block 218, the most current status of the wait object may be analyzed in block 220.

If the wait object were copied into a memory pipeline and the wait object was negative, but the receiving thread changed the status of the wait object while the wait object was in the sending thread memory pipeline, the sending thread may incorrectly assume the receiving thread was in a polling mode and a race or hang condition may exist.

The receiver thread 204 may perform a polling receiving method 224 and, when indicated, may change to a notification method through a changeover method 238.

In the polling receiving method 224, the receiving thread may get the receive index in block 226, purge the memory pipelines in block 227, and poll the transmit index in block 228. The transmit index may be set by the sending thread in block 212 and read by the receiving thread in block 228. The retrieve index of block 226 may be the index used by the receiving thread 204 to indicate the last message that was processed.

As with the sending thread in block 214, the memory pipelines may be purged on the receiver thread in block 227. By purging the memory pipelines in block 227, the receiver thread may ensure that the value for the transmit index 228 is the latest value and not a value contained in the memory pipeline. If the sending thread 202 were to change the transmit index in block 212 while a value was in the memory pipeline, the receiver thread 204 may enter into the changeover method 237 and begin a notification method of communication while a message is pending. Such a situation may cause the communication system to hang or pause.

If the retrieve index equals the transmit index in block 230, there are no new messages to process and the process may return to block 226. When the receiving thread 204 loops between blocks 226, 227, 228, and 230, the receiving thread polls the transmit index 226 until a message is available.

When the retrieve index is different from the transmit index in block 230, the receiving thread may retrieve the address for the message from the buffer in block 232 and get the message from shared memory in block 234 using the address from block 232. After retrieving the message in block 234, the receive index may be incremented in block 236.

If the retrieve index and transmit index are the same in block 230, the receiver thread 204 may enter the changeover method 237.

In the changeover method 237, a determination is made in block 240 to enter notification mode. If notification mode is not to be entered in block 240, the process may return to block 226 and polling mode may resume.

If notification mode is to be entered in block 240, a wait object may be set in block 242 and the memory pipelines may be purged in block 244. The receiver thread may wait in block 246 until an awake object is received, unset the wait object in block 248, and may then return to block 226 to enter the polling receive method 224.

By causing the memory pipelines to be purged in block 244, the wait object may be immediately updated to memory. This will minimize any chance that the sending thread 202 may read the wait object in block 218 with an outdated value and create a paused or hung condition.

The notification mode may be entered in block 240 using different criteria in different embodiments. In some conditions, the notification mode may be entered when the receiver thread 204 has a process or activity that may be a higher priority than the messages from the sending thread. In other conditions, the notification mode may be entered when the receiving thread has been in a polling mode for a certain period of time without receiving any messages. In such a case, the receiving thread may enter a low power or sleep mode until awoken by the awake object to resume polling for messages.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method of communicating between a sender thread and a receiving thread through shared memory, the method comprising:
    sending a first message by said sender thread by a polling transmission method comprising:
        storing said first message;
        changing a transmit index; and
        forcing a purge of a second memory pipeline for said sender thread after said changing said transmit index;
    receiving said first message by said receiving thread by a polling receiving method comprising:
        reading said transmit index to determine that said first message is ready to be read; and
        reading said first message;
    changing to a synchronization object receiving method by said receiving thread by a first changeover method comprising:
        forcing a purge of a first memory pipeline for said receiving thread prior to setting a wait object;
        setting said wait object, said wait object being an indicator that said receiving thread is not polling for messages;
    transmitting a second message by said sender thread by a synchronization object transmission method comprising:
        detecting that said wait object is set;
        setting an awake object;
        storing said second message; and
        changing said transmit index;
    determining that no new messages are available; and
    changing from a synchronization object receiving method by said receiving thread to said polling transmission method by a second changeover method comprising:
        receiving said awake object; and
        executing said polling receiving method.

2. The method of claim 1, said changing said transmit index comprising toggling said transmit index.

3. The method of claim 1, said changing said transmit index comprising incrementing said transmit index.

4. The method of claim 3, said transmit index comprising a first pointer to a buffer.

5. The method of claim 4, said polling transmission method further comprising: storing a second pointer in said buffer, said second pointer comprising an address to said first message.

6. The method of claim 4, said buffer being a circular buffer.

7. The method of claim 1, said polling receiving method further comprising: comparing said transmit index to a receive index to determine said first message is ready to be read.

8. The method of claim 7, said polling receiving method further comprising: incrementing said receive index after said reading said first message from said shared memory.

9. A system comprising:
a first thread;
a second thread;
a shared memory capable of being accessed by said first thread and said second thread;
one of said first thread and said second thread being a sender thread and the other of said first thread and said second thread being a receiving thread, said sender thread and said receiving thread being configured to communicate using a method comprising:
sending a first message by said sender thread by a polling transmission method comprising:
storing said first message in said shared memory;
changing a transmit index; and
forcing a purge of a second memory pipeline for said sender thread after said changing said transmit index;
receiving said first message by said receiving thread by a polling receiving method comprising:
reading said transmit index to determine that said first message is ready to be read; and
reading said first message from said shared memory;
changing to a synchronization object receiving method by said receiving thread by a first changeover method comprising:
forcing a purge of a first memory pipeline for said receiving thread prior to setting a wait object;
setting said wait object, said wait object being an indicator that said receiving thread is not polling for messages;
transmitting a second message by said sender thread by a synchronization object transmission method comprising:
detecting that said wait object is set;
setting an awake object;
storing said second message in said shared memory; and
changing said transmit index;
determining that no new messages are available; and
changing from a synchronization object receiving method by said receiving thread to said polling transmission method by a second changeover method comprising:
receiving said awake object; and
executing said polling receiving method.

10. The system of claim 9, said first thread being said sender thread and said second thread being said receiving thread.

11. The system of claim 10, said second thread being configurable as said sender thread and said first thread being configurable as said receiving thread.

12. The system of claim 9, said changing said transmit index comprising incrementing said transmit index.

13. The system of claim 12, said transmit index comprising a first pointer to a buffer.

14. The system of claim 13, said polling transmission method further comprising: storing a second pointer in said buffer, said second pointer comprising an address to said first message.

15. The system of claim 14, said buffer being a circular buffer.

16. A method of communicating between a sender thread and a receiving thread through shared memory, the method comprising:
sending a first message by said sender thread by a polling transmission method comprising:
storing said first message in said shared memory;
storing a pointer to said first message in a first register of a first buffer;
changing a transmit index to indicate said first register of said first buffer; and
purging a memory pipeline of said sender thread after said changing said transmit index;
receiving said first message by said receiving thread by a polling receiving method comprising:
reading said transmit index;
reading a receive index;
comparing said transmit index to said receive index to determine that said transmit index and said receive index are different;
incrementing said receive index;
reading said first register from said first buffer, said first register corresponding to said receive index; and
reading said first message from said shared memory;
changing to a synchronization object receiving method by said receiving thread by a first changeover method comprising:
forcing a purge of a second memory pipeline for said receiving thread prior to setting a wait object;
setting said wait object, said wait object being an indicator that said receiving thread is not polling for messages;
transmitting a second message by said sender thread by a synchronization object transmission method comprising:
detecting that said wait object is set;
setting an awake object;
storing said second message in said shared memory; and
changing said transmit index;
determining that no new messages are available; and
changing from a synchronization object receiving method by said receiving thread to said polling transmission method by a second changeover method comprising:
receiving said awake object; and
executing said polling receiving method.

* * * * *